(12) United States Patent
John et al.

(10) Patent No.: US 9,595,865 B2
(45) Date of Patent: Mar. 14, 2017

(54) CONVERTER UNIT AND METHOD FOR CONVERTING A VOLTAGE

(71) Applicant: PHILIPS LIGHTING HOLDING B.V., Eindhoven (NL)

(72) Inventors: David Llewellyn John, Willingham (GB); Peter Blanken, Nuenen (NL); Reinhold Elferich, Aachen (DE)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/904,296

(22) PCT Filed: Aug. 30, 2014

(86) PCT No.: PCT/EP2014/068455
§ 371 (c)(1),
(2) Date: Jan. 11, 2016

(87) PCT Pub. No.: WO2015/028652
PCT Pub. Date: Mar. 5, 2015

(65) Prior Publication Data
US 2016/0156263 A1  Jun. 2, 2016

(30) Foreign Application Priority Data
Aug. 30, 2013 (EP) .................................... 13182322

(51) Int. Cl.
G05F 1/571 (2006.01)
H02M 3/156 (2006.01)
H02M 1/00 (2006.01)

(52) U.S. Cl.
CPC .... *H02M 3/156* (2013.01); *H02M 2001/0009* (2013.01); *H02M 2001/0058* (2013.01); *Y02B 70/1491* (2013.01)

(58) Field of Classification Search
CPC ............. H02M 3/156; H02M 3/33507; H02M 3/33515; H02M 3/1588; H02M 3/1584;
(Continued)

(56) References Cited

U.S. PATENT DOCUMENTS 3,140,406 A   7/1964  Thompson
4,088,882 A   5/1978  Lewis
(Continued)

FOREIGN PATENT DOCUMENTS

EP         2528216 A1    11/2012

OTHER PUBLICATIONS

Kester et al: "Switching Regulators"; Analog Devices, 1991, 71 Page Document.
(Continued)

*Primary Examiner* — Jue Zhang
*Assistant Examiner* — Kevin H Sprenger

(57) ABSTRACT

In various examples, a converter unit for converting an input voltage to an output voltage is disclosed. The converter includes input terminals for connecting the converter unit to a voltage supply and for receiving the input voltage from the voltage supply and output terminals for connecting the converter unit to a load for driving the load. A controllable switch is connected to an inductor. The converter unit further includes a current detector for detecting a current of the inductor, a voltage slope detector for detecting a slope of a voltage measured across the controllable switch, and a control unit for controlling the controllable switch on the basis of the inductor current and the voltage slope.

11 Claims, 5 Drawing Sheets

(58) Field of Classification Search
CPC .... H02M 3/158; H02M 3/157; H02M 3/1563; G05F 1/575; G05F 1/56; G05F 1/565; G05F 1/573; G05F 1/569; G05F 1/5735
USPC ................................ 323/273–277, 282, 288
See application file for complete search history.

(56) References Cited

U.S. PATENT DOCUMENTS

| | | | |
|---|---|---|---|
| 4,888,821 | A | 12/1989 | Hamp, III et al. |
| 6,262,620 | B1 | 7/2001 | Jenski et al. |
| 9,252,669 | B2* | 2/2016 | Nate .................... H02M 3/335 |
| 2007/0040533 | A1 | 2/2007 | Krein |
| 2007/0103943 | A1 | 5/2007 | Mangtani et al. |
| 2008/0239773 | A1 | 10/2008 | Yang |
| 2009/0278516 | A1 | 11/2009 | Bhagwat et al. |
| 2010/0188007 | A1 | 7/2010 | Deppe et al. |
| 2011/0025283 | A1* | 2/2011 | Futamura ............ H02M 3/1588 |
| | | | 323/282 |
| 2012/0286752 | A1 | 11/2012 | Tsukiji et al. |
| 2013/0147459 | A1* | 6/2013 | Kim .................... B60L 3/0038 |
| | | | 323/351 |
| 2013/0293270 | A1* | 11/2013 | Lee .................... H03K 5/00006 |
| | | | 327/113 |
| 2014/0210484 | A1* | 7/2014 | Beck .................... H02H 3/044 |
| | | | 324/509 |

OTHER PUBLICATIONS

"Turn-On Switching Loss of an Asynchronous Buck Converter"; Maxim Integrated, Application Note 912, Dec. 2001, 5 Page Document.
Sampath: "Digital Peak Current Mode Control of Buck Converter Using MC56F8257 DSC"; Freescale Semiconductor, Application Note, Document No. AN4716, Rev. 1, May 2013, 22 Page Document.
Spiazzi: "Analysis of Buck Converters Used As Power Factor Preregulators"; IEEE Power Electron. Spec. Conf. Rec. 1997, pp. 564-570.
Huber: et al: "Design-Oriented Analysis and Performance Evalutation of Buck PFC Front End"; IEEE Transactions on Power Electronics, vol. 25, No. 1, Jan. 2010.
Endo et al: "A High-Power-Factor Buck Converter"; IEEE Power Electron Spec. Conf. Rec., 1992, pp. 1071-1075.

* cited by examiner

CONVERTER UNIT AND METHOD FOR CONVERTING A VOLTAGE

CROSS-REFERENCE TO PRIOR APPLICATIONS

This application is the U.S. National Phase application under 35 U.S.C. §371 of International Application No. PCT/EP2014/068455, filed on Aug. 30, 2014, which claims the benefit of European Patent Application No. 13182322.1, filed on Aug. 30, 2013. These applications are hereby incorporated by reference herein.

FIELD OF THE INVENTION

The present invention relates to a converter unit for converting an input voltage to an output voltage and to a corresponding method.

BACKGROUND OF THE INVENTION

In the field of power conversion, the switched-mode power supply (SMPS) is a standard choice. Different implementations of SMPSs are known comprising two controllable switches along with an inductor as a synchronous converter or one controllable switch along with an inductor and a diode or capacitor as an asynchronous converter. In the following discussion, the step-down, or buck, converter will be used as the example SMPS topology; however, the concepts may also be applied to boost, buck-boost, Class E, etc. converters.

The output voltage of a SMPS is controlled by switching the controllable switch(es) on and off, wherein usually a high frequency control loop and a low frequency control loop are used for controlling the controllable switch(es). Using an asynchronous SMPS with one controllable switch as an example, the output voltage may be controlled on the basis of the switching frequency or on the basis of the duty cycle of the controllable switch, wherein a duty cycle control can be achieved by comparing a ramp signal having a fixed frequency with a reference signal and the switching time is determined when the ramp signal reaches the reference signal. In this case, the low-frequency control loop provides the reference signal e.g. on the basis of the input current, the output current, the output voltage or the output power, and the high-frequency control loop controls the switching based on the ramp signal and the reference signal. Usually the controllable switch is switched on when the ramp signal is lower than the reference signal and the controllable switch is switched off when the ramp signal is higher than the reference signal. The output power or output current of the converter can be controlled by setting the reference signal to a higher value or a lower value by means of the low-frequency control loop.

In order to minimize the switching losses of the converter unit, the switching time has to be synchronized to the voltage across the controllable switch. In asynchronous SMPSs, the controllable switch is switched on when the voltage across the controllable switch is zero (zero voltage switching) or reaches a local minimum (valley switching). This serves to minimize the switching losses of the controllable switch.

Existing state of the art controllers are configured to switch the controllable switch on when the current in the inductor is zero or when a minimum value is detected. In these controllers, it is common to utilize an on-time control determined by the low-frequency control loop in combination with an oscillator circuitry such as a ramp signal in combination with a reference signal.

In an alternative solution, the controllable switch is switched off when the inductor current reaches a peak threshold and the controllable switch is switched on when the inductor current crosses zero. However, due to switching delays and reverse recovery times of the diodes, this may yield a suboptimal switching time; hence, switching losses are not minimized with such a scheme.

From EP 2 528 216 A1, a self-oscillating buck converter is known using a threshold control on the basis of the inductor current and the switch voltage. However, the detection of the on transition of the controllable switch is difficult for AC to DC applications when a rectifier unit is connected to the input terminals. This is due to either zero-voltage- or valley-switching being required at different points in the ac cycle, which is not easily handled via a fixed voltage threshold. As a result, the switching losses are not minimized in such a case.

US2012286752 (D1) discloses a control circuit for a switching regulator. The circuit comprises an inductor, a controllable switch and a current detector. The detected inductor current is used to control the switch. The control circuit also includes a slew rate control that controls an electric current value of at least one of a high-side variable current source and a low-side variable current source, which slew rate control defines the rate of change of the switch voltage signal provided to the switch.

US488882 (D2) discloses a synchronization circuit for a resonant flyback high voltage supply. The circuit is provided with a negative slope detection circuitry. The basic function of the negative slope detection circuitry is to disable a switch during the falling slope of the flyback waveform until the dv/dt of the negative slope is equal to zero.

SUMMARY OF THE INVENTION

It is an object of the present invention to provide an improved converter unit for converting an input voltage to an output voltage and a corresponding method for converting an input voltage to an output voltage with a high power factor and low technical effort.

According to one aspect of the present invention, a converter unit for converting an input voltage to an output voltage is provided, comprising:
  input terminals for connecting the converter unit to a voltage supply and for receiving the input voltage from the voltage supply,
  output terminals for connecting the converter unit to a load for driving the load,
  a controllable switch,
  an inductor connected to the controllable switch,
  a current detector for detecting a current of the inductor,
  a voltage slope detector for detecting a slope of a voltage measured across the controllable switch, and
  a control unit for controlling the controllable switch on the basis of the inductor current and the voltage slope, and
  wherein the voltage slope detector comprises two diodes connected antiparallel to each other and connected via a capacitor to the controllable switch, a voltage detector for detecting a voltage at the two diodes and an offset voltage source for providing an offset voltage potential to the two diodes.

Preferred embodiments of the invention are defined in the dependent claims. It should be understood that the claimed method has similar and/or identical preferred embodiments as the claimed device and as defined in the dependent claims.

The present invention is based on the idea to switch the controllable switch of the converter unit on the basis of the detected inductor current and the slope of a voltage dropping across the controllable switch. Since the controllable switch is switched-off on the basis of the inductor current, the same current threshold can be applied throughout a whole AC cycle so that a high power factor can be achieved comparable to a constant, low-frequency input current. Since the controllable switch is switched-on on the basis of the slope detection, a minimum of the switch voltage can be detected early in the cycle so that the controllable switch can be switched precisely at the minimum voltage and the switching loss of the controllable switch can be minimized. Hence, the power factor can be increased without the need of multiplier circuitries or averaging of the low-frequency control loop so that the technical effort of the converter unit is reduced, while maintaining low switching losses. Since the voltage slope detector comprises two diodes connected antiparallel to each other and connected to the controllable switch, via a capacitor, and a voltage detector for detecting a voltage at the two diodes, the possibility is provided to detect a logic-high voltage when the voltage slope is positive and a logic-low voltage when the voltage slope is negative. The current through the capacitor is proportional to the slope of the voltage across the controllable switch. As the voltage slope detector comprises an offset voltage source for providing an offset voltage potential to the two diodes it is a possible to distinguish a logic-low and a logic-high voltage value detected at the two diodes with respect to the offset voltage potential so that the voltage slope detection is more reliable.

In a preferred embodiment, a blocking device such as a diode or a capacitor is connected to the controllable switch. In other words, the controllable switch, the inductor and the blocking device share a common node. Hence, the converter unit can be formed as a step-up converter, a step-down converter or a class E SMPS.

In a preferred embodiment, the control unit is adapted to switch the controllable switch off based on the detected inductor current and to switch the controllable switch on based on the detected voltage slope. The peak current control is a simple solution to yield a good power factor and the use of the voltage slope allows one to reduce the switching losses when the controllable switch is switched on by switching at the appropriate time.

In a preferred embodiment, the control unit is adapted to switch the controllable switch off when the inductor current reaches a threshold value and to switch the controllable switch on when the voltage slope reaches a predefined value. This is a possibility to precisely control the controllable switch in order to increase the power factor while maintaining low switching losses.

In a preferred embodiment, the current detector comprises a resistor connected in series to the controllable switch and comprises a voltage detector for detecting a voltage across the resistor. This is a possibility to detect the inductor current while the controllable switch is on with low technical effort, wherein a differential voltage measurement can be omitted if the resistor is connected to ground.

It is further preferred to connect the resistor in series to the inductor. This is a possibility to detect the inductor current with low technical effort.

In a preferred embodiment, the voltage slope detector comprises a reference current source e.g. realized by a reference voltage source connected via a reference resistor to the two diodes. This is a possibility to adjust the voltage slope detector and to adjust a trigger point for triggering the controllable switch.

In a preferred embodiment, the current detector comprises a plurality of sensor switches connected in parallel to each other and connected in parallel to the controllable switch for dividing the inductor current in a plurality of sense currents. This is a possibility to provide a current detector with low technical effort which can be integrated in an integrated circuit.

In a preferred embodiment, the current detector comprises a comparator circuit for comparing one of the sensed currents to a reference current. This is a possibility to determine the inductor current on the basis of one of the sensed currents precisely with low technical effort.

In a preferred embodiment, a sensor switch is connected via a sense resistor in parallel to the controllable switch to detect a sense voltage at the sense resistor corresponding to the inductor current. This is a possibility to detect the inductor current with low technical effort and high accuracy.

In a preferred embodiment, the control unit is adapted to control the controllable switch on the basis of the inductor current and two different consecutive voltage slope values. This is a possibility to prepare the control unit when the voltage starts to drop and the voltage slope is negative and to switch the controllable switch on when the voltage slope value reaches sufficiently close to the following zero crossing or voltage minimum. This is a possibility to enhance the robustness of the switching of the controllable switch.

In a preferred embodiment, the control unit comprises at least one logical gate for controlling the controllable switch on the basis of the voltage slope and the inductor current. This is a possibility to implement the control of the controllable switch with low technical effort.

In a further preferred embodiment, the converter unit is a step-down converter.

In a further preferred embodiment, the converter unit is a step-up converter.

In a further preferred embodiment, the converter unit is a resonant Class E converter.

As mentioned above, the present invention is based on the idea to control the switching of the controllable switch based on the inductor current compared to a threshold value and on the basis of the voltage slope of the voltage across the controllable switch. The controllable switch is switched off when the inductor current reaches the threshold value and is switched on when the voltage across the controllable switch reaches a minimum value or reaches a zero crossing. Utilizing a constant inductor current threshold throughout a whole AC cycle provides a high power factor such as what results from a constant, low-frequency input current. Due to the detection of the voltage slope a delay or a recovery time can be compensated and the controllable switch can be switched precisely at the zero crossing or at a minimum, so that the switching losses of the controllable switch are reduced. Hence, the power factor of the converter unit can be increased with minimized switching losses by precisely switching the controllable switch with low technical effort.

BRIEF DESCRIPTION OF THE DRAWINGS

These and other aspects of the invention will be apparent from and elucidated with reference to the embodiment(s) described hereinafter. In the following drawings

DETAILED DESCRIPTION OF THE INVENTION

Figure 1:
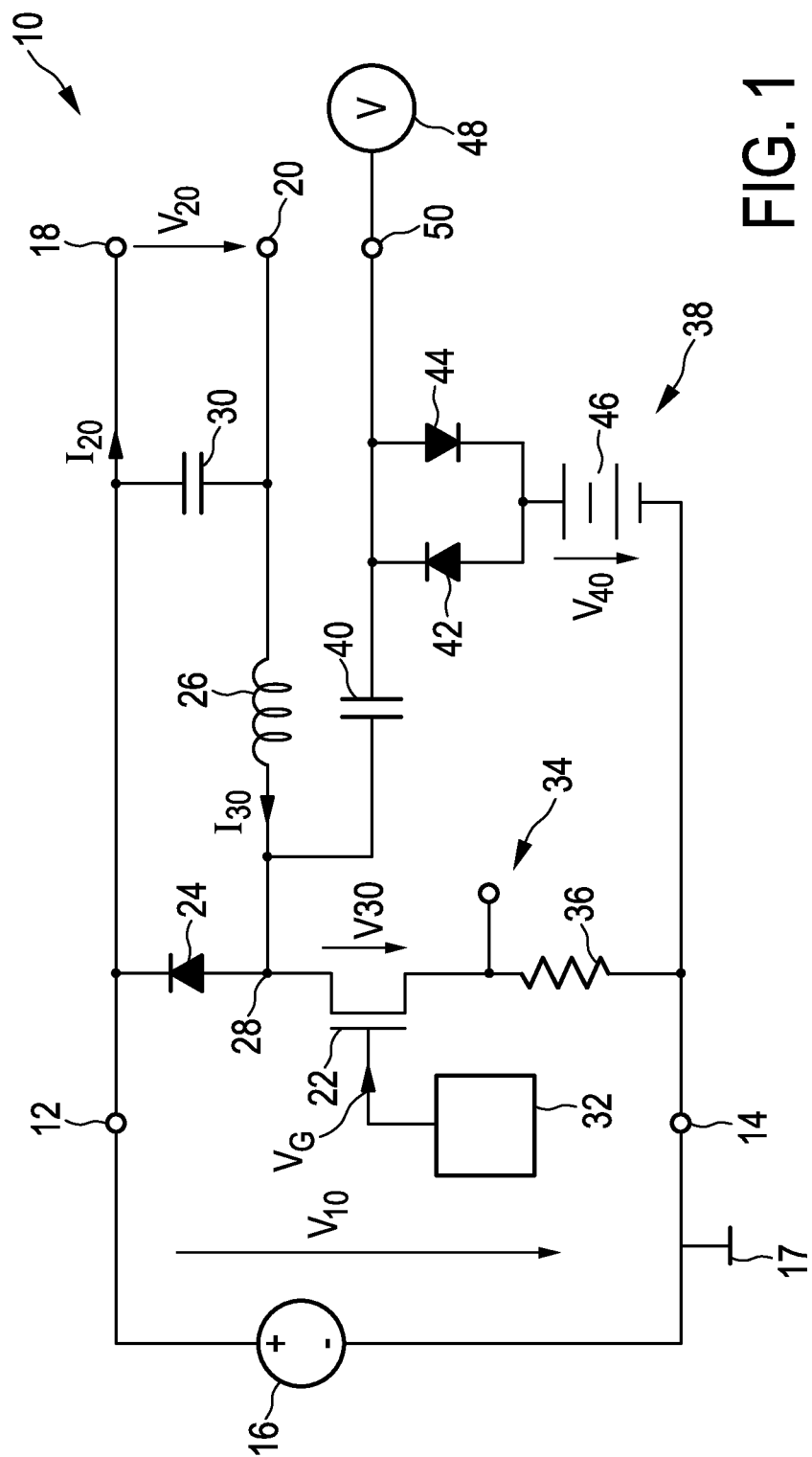
FIG. 1 shows a schematic block diagram of a converter unit for converting an input voltage to an output voltage.

FIG. 1 shows a schematic block diagram of an example step-down converter unit generally denoted by 10. The converter unit 10 comprises input terminals 12, 14 for connecting the converter unit to a voltage supply 16 which provides an input voltage V10. The input terminal 14 is further connected to ground potential 17. The converter unit further comprises output terminals 18, 20 for providing an output voltage V20 and an output current I20 to a load (not shown) for driving the load. The converter unit 10 comprises a controllable switch 22 and a diode 24 connected in parallel to the input terminals 12, 14 and an inductor 26 connected to a node 28 between the controllable switch 22 and the diode 24 and further connected to one of the output terminals 20. The controllable switch is preferably a transistor and most preferred a MOSFET. The output terminals 18, 20 are further connected to a filter capacitor 30 for filtering the output voltage V20. The converter unit 10 further comprises a control unit 32 for controlling the controllable switch 22 via a gate voltage $V_G$ provided as a drive signal to switch the controllable switch 22 in order to convert the input voltage V10 to the output voltage V20. The converter unit 10 is a DC-DC or AC-DC converter and in this case is a step-down converter which converts the input voltage V10 to a lower output voltage V20. The input voltage V10 may be a constant voltage or a rectified AC voltage.

The output voltage V20 is set by means of a frequency and a duty cycle of the controllable switch 22 as described in the following.

The converter unit 10 further comprises a current detector 34 connected to the controllable switch 22 for detecting an inductor current I30 in the inductor 26 during the on-state of the controllable switch 22. The current sensor 34 comprises a sense resistor 36 and a voltage detector (not shown) for measuring a voltage dropping across the sense resistor 36 in order to detect a voltage corresponding to the inductor current I30 during the on-state of the controllable switch 22. The sense resistor 36 may be connected between the input terminal 14 or ground and the controllable switch 22 or between the controllable switch 22 and the inductor 26.

The converter unit 10 further comprises a voltage slope detector 38 for detecting a voltage slope of a switch voltage V30 dropping across the controllable switch 22. The voltage slope detector 38 is connected to the node 28 via a capacitor 40 and comprises two diodes 42, 44 connected antiparallel to each other and connected in series to the capacitor 40 and an offset voltage supply 46 providing an offset voltage V40. The voltage slope detector 38 is connected to a voltage detector 48 for detecting a voltage at the voltage slope detector 38 indicating the voltage slope of the switch voltage V30.

The control unit 32 is connected to the current sensor 34 and to the voltage slope detector 38 in order to control the controllable switch 22 on the basis of the inductor current I30 and a voltage slope signal 50 detected by the voltage detector 48.

The voltage across the sense resistor 36 is fed into a comparator device for comparing the measured inductor current I30 to a reference value for switching the controllable switch 22 off. The voltage slope detector provides the voltage slope signal 50 which has a logic-high value if the voltage slope is positive and a logic-low value if the voltage slope is negative with respect to the offset voltage V40 provided by the offset voltage supply 46. Specifically, the voltage slope signal 50 is one diode-drop above the offset voltage V40 if the voltage slope is positive and has a voltage drop one diode-drop below the offset voltage V40 if the voltage slope is negative. The voltage slope signal 50 is provided to the control unit 32 in order to switch the controllable switch 22 on when the voltage slope of the switch voltage V30 is equal to zero or when the switch voltage V30 has a minimum.

The turn-off procedure of the controllable switch 22 is as follows. When the controllable switch 22 is turned on, the inductor current I30 begins to rise. At a certain point, the inductor current I30 reaches a predefined inductor current threshold level and a corresponding current sensor signal which is provided to the control unit 32 changes. This current sensor signal causes the control unit 32 to turn the controllable switch 22 off (after a certain delay time). Hence, the controllable switch 22 is switched off on the basis of the inductor current I30 and the inductor current threshold.

The turn-on procedure of the controllable switch is as follows. When the controllable switch 22 is turned off, the inductor current I30 eventually starts to decrease. The junction capacitance of the diode 24 and the output capacitance of the turned-off controllable switch 22 and the capacitance of the voltage-slope-detecting capacitor 40 are now three parallel capacitances in series with the inductor 26 and form a resonant LC-circuit. At a certain point, the inductor current I30 crosses zero and (e.g. after the diode reverse recovery has completed) the resonant interval of the LC-circuit begins and decreases the switch voltage V30. At this point the voltage slope detector 38 indicates or detects a negative voltage slope. The corresponding voltage slope signal 50 is provided to the control unit 32 and the control unit 32 switches the controllable switch 22 after a delay on. In other words, the switch is turned on at some point after the voltage slope first becomes negative.

In an alternative embodiment, a minimum of the switch voltage V30 is determined by detecting when the switch voltage first starts to decrease. Once this condition is met, the control unit 32 switches the controllable switch 22 on when the slope of the switch voltage V30 next comes sufficiently close to zero. In other words, the switch is turned on at some point close to the negative-to-positive transition in the voltage slope.

These two embodiments can be provided in combination with a voltage threshold comparison for intermediate switching if the corresponding zero voltage switching condition is met. The first embodiment is the optimal voltage slope detection in terms of speed-of-execution even if this embodiment is less robust in terms of tolerance to changes in the timing of the resonant interval. An additional circuitry for voltage threshold comparison may be necessary depending on the properties of the body diode of the MOSFET which will begin conducting automatically when the zero voltage switching conditions are met. If the body diode is too lossy, the additional detection circuitry may be desirable in order to minimize or prevent the conduction of the body diode of the MOSFET.

In an alternative embodiment of the current sensor 34 a small fraction of the inductor current 130 is compared to a threshold current level representing the inductor current threshold. The inductor current 130 is measured by means of a large number of FET cells which are connected in parallel to each other and in series with the controllable switch 22. The current in a small number of these FET cells is compared to a scaled inductor current threshold in order to switch the controllable switch 22 off. This assumes that the gate connector and the source connector of the FET cell are interconnected.

In a further alternative embodiment the current sensor 34 comprises a large number of FET cells wherein the drain and the gate connectors are interconnected, and wherein a small number of source connectors are separated from the other FET cells. A sense resistor is connected between the separated FET sources and the source connectors of the other FET cells. A voltage across the sense resistor can be measured corresponding to the inductor current 130 and if the resistance of the sense resistor is small, with respect to the amount of FET cells, the inductor current 130 can be measured with sufficient accuracy.

In a further alternative embodiment an extra winding may be configured on the inductor in order to provide an inductively coupled current which is a scaled version of 130. This scaled current may then be sensed using any of the aforementioned techniques.

In general, the components of the converter unit 10 are discrete components, however, the converter unit 10 may be implemented as an integrated circuit and/or may perform signal processing in the digital domain using one or more analog-to-digital and/or digital-to-analog converters.

Figure 2:
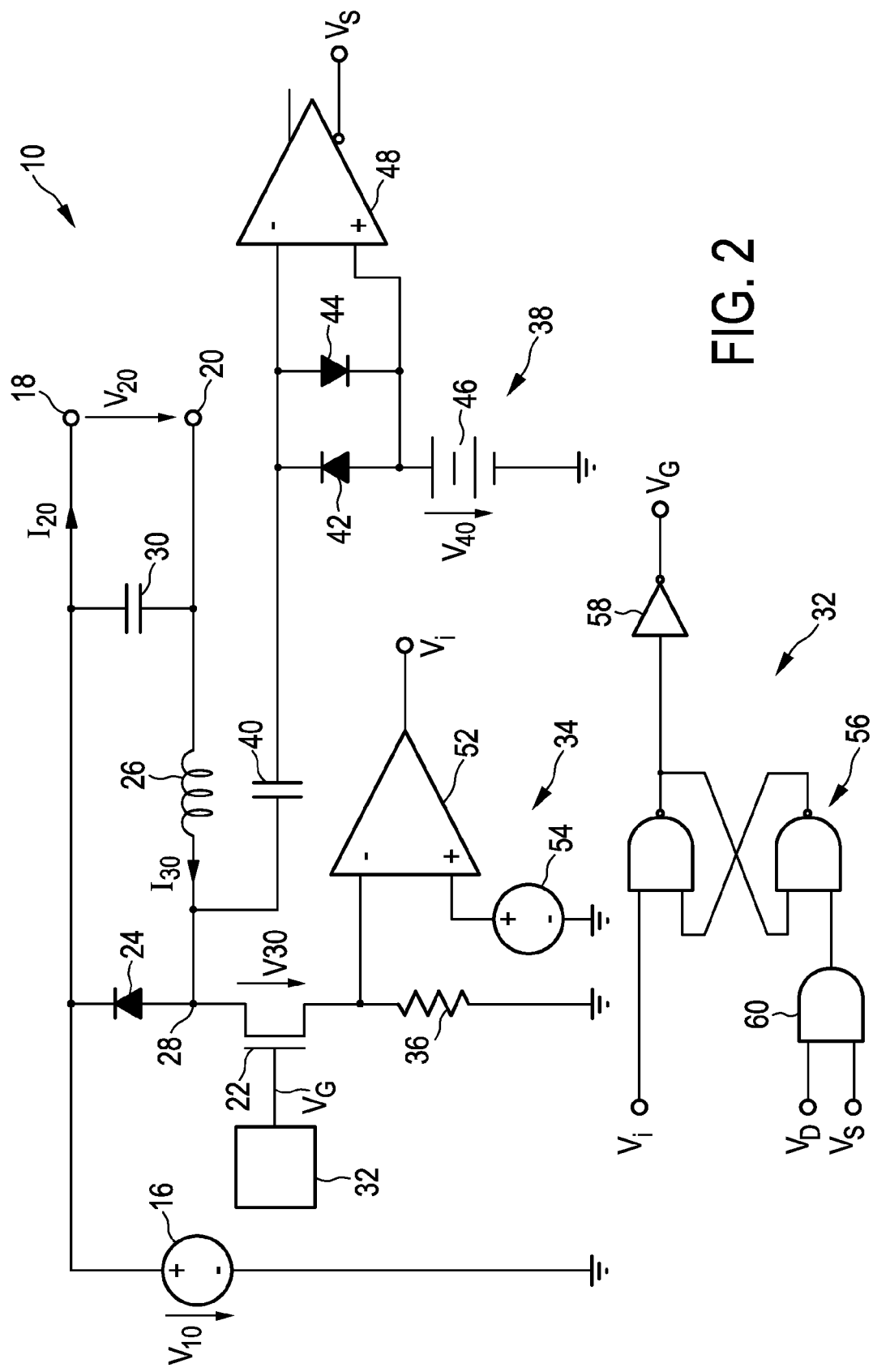
FIG. 2 shows a detailed block diagram of an embodiment of the converter unit shown in FIG. 1, FIG. 3 *a-e* show timing diagrams of a voltage and a current of the converter unit and the corresponding control signals for controlling the controllable switch.

FIG. 2 shows an embodiment of the converter unit 10 and an embodiment of the control unit 32 for controlling the controllable switch 22. Identical elements are denoted by identical reference numerals, wherein here merely the differences are explained in detail.

The current sensor 34 comprises the sense resistor 36 and a comparator 52 connected to a reference voltage supply 54. The reference voltage supply provides a reference voltage as threshold voltage for determining the inductor current threshold. The comparator 52 provides a signal $V_i$ indicating whether the voltage across the sense resistor 36 is above the reference voltage provided by the reference voltage supply 54. The signal $V_i$ is provided to the control unit 32 for switching the controllable switch 22 as described in the following.

The voltage slope detector 38 comprises a comparator as the voltage detector 48 connected in parallel to the antiparallel diodes 42, 44 for determining a voltage across the diodes 42, 44. The comparator 48 provides a signal $V_S$ indicating whether the slope of the switch voltage V30 is positive or negative. The signal $V_S$ is provided to the control unit 32 for switching the controllable switch 22.

The signal $V_i$ is logic-high if the inductor current 130 is below the threshold and logic-low if the inductor current 130 is above the threshold. The signal $V_S$ is logic-high if the slope of the switch voltage V30 is positive and logic-low if the slope of the switch voltage V30 is negative.

The control unit 32 is schematically shown in FIG. 2. The control unit 32 comprises a flip flop 56 implemented as a NAND-latch 56. The signals $V_i$ and $V_S$ are fed into the flip flop 56, wherein the flip flop 56 is connected via an inverter 58 to a gate connector of the controllable switch 22. The signals $V_i$ and $V_S$ are fed into the NAND-latch 56 to switch the controllable switch 22 on and off on the basis of the inductor current 130 and the slope of the switch voltage V30. The control unit 32 further comprises an AND-gate 60 connected to the flip flop 56 to include a time out signal $V_D$ to switch the controllable switch on. The time out signal $V_D$ is a signal from a timer circuitry (not shown) that activates the switch 22 if too much time has passed whether a minimum of the switch voltage V30 has been detected or not. The time out signal $V_D$ is logic-low if the time out condition has been reached and is logic-high in normal operation. The time out circuitry is mainly utilized to assist in the start-up behavior of the control unit 32. Hence, the control unit 32 switches the controllable switch off on the basis of the inductor current 130 with respect to a threshold value and on the basis of the slope of the switch voltage V30.

Figure 3:
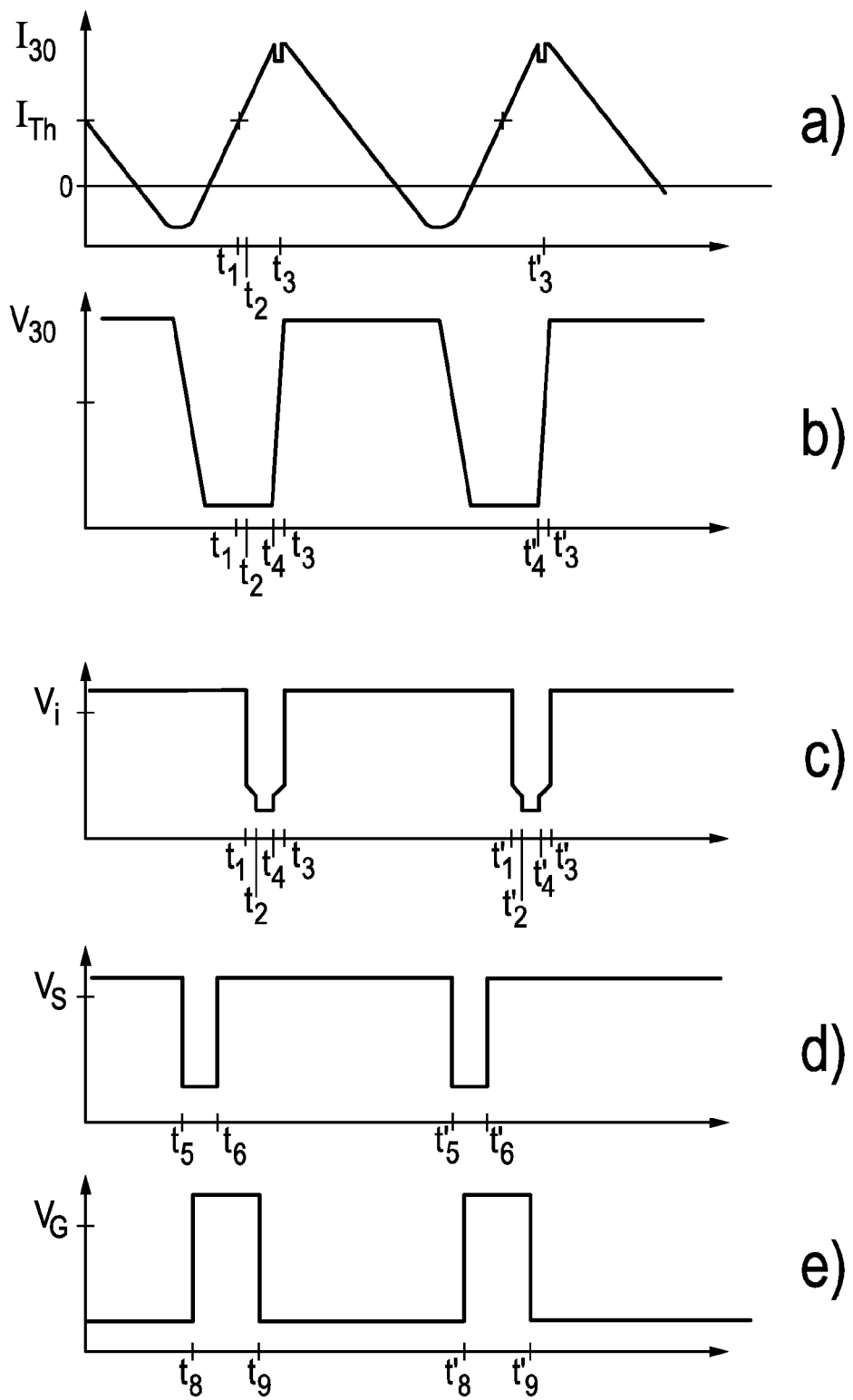

FIG. 3 shows timing diagrams of the switch voltage V30, the inductor current 130, the signals $V_i$ and $V_S$ and a gate voltage $V_G$ provided as a drive signal to switch the controllable switch 22.

The inductor current 130 is shown in FIG. 3a, and the switch voltage V30 is shown in FIG. 3b.

The signal $V_i$ provided by the comparator 52 is shown in FIG. 3c indicating whether the inductor current 130 is above or below the threshold. The inductor current 130 reaches the threshold current at $t_1$ and the signal $V_i$ is switched to logic-low shortly thereafter at $t_2$ due to delays in the current detector 34. The actual peak of the inductor current 130 occurs some time later, at $t_3$, due to delays and resonances in the system. For the current sense resistor 36 in the position shown in FIG. 1, the signal $V_i$ is switched to logic-high shortly after the controllable switch is turned off at $t_4$. For a current sense resistor 36 in series with the inductor 26, the signal $V_i$ would be switched to logic-high shortly after 130 drops below the current threshold; however, this configuration is not shown in these waveforms.

The signal $V_S$ shown in FIG. 3d indicates the slope of the switch voltage V30, wherein the signal $V_S$ is switched to logic-low when the slope of the switch voltage V30 is sufficiently negative at $t_5$ and switched to logic-high when the slope of the switch voltage V30 is sufficiently positive at $t_6$.

The signals $V_i$ and $V_S$ are combined by means of the NAND-latch 56 to provide the gate voltage $V_G$ as shown in FIG. 3e. The gate signal $V_G$ goes logic-low shortly after $V_i$ goes logic-low at $t_9$, and $V_G$ goes logic-high shortly after $V_s$ goes logic-low at $t_8$.

Figure 4:
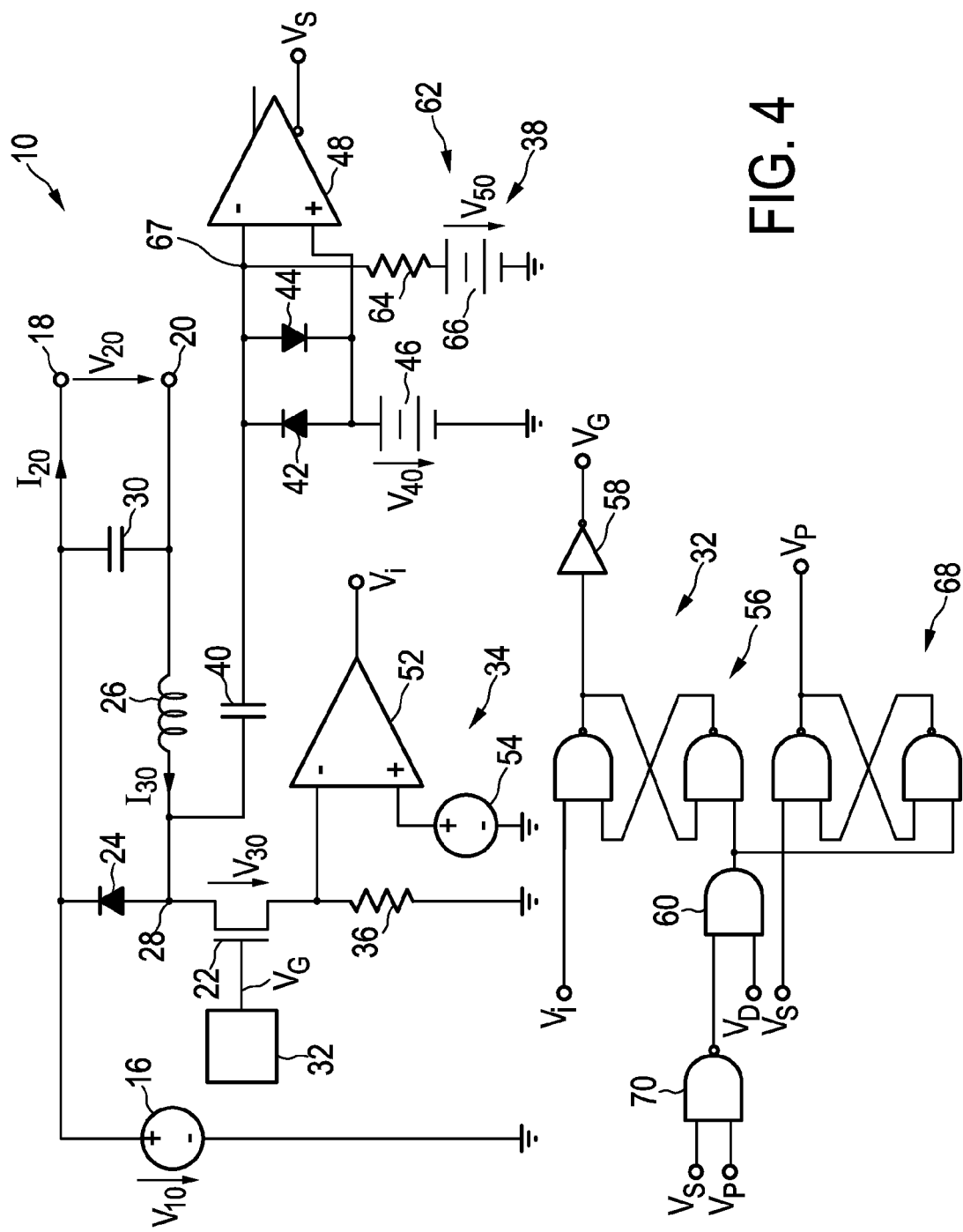
FIG. 4 shows a detailed block diagram of an embodiment of the control unit shown in FIG. 1, and FIG. 5 *a-f* show timing diagrams of a voltage and a current of the converter unit and the corresponding control signals for controlling the controllable switch.

FIG. 4 shows a schematic block diagram of a second embodiment of the converter unit 10. Identical elements are denoted by identical reference numerals wherein here merely the differences are explained in detail.

The voltage slope detector 38 further comprises a current source 62 including a resistor 64 and a local voltage supply 66. The current source 62 provides a source or sink current to a detection node 67 at the diodes 42, 44. By means of the current source 62, a threshold is adjusted for determining when the slope of the switch voltage V30 is detected as being either "positive" or "negative". The signal $V_S$ will change from logic-high to logic-low when the sufficiently negative slope is detected (after a delay). By adjusting the trigger point for the high-to-low transition, the circuit delays can be compensated for precise operation of the converter unit 10. The offset voltage V40 is sufficiently below the supply voltage V50 provided by the local voltage supply 66. Hence, the voltage drop at the diodes 42, 44 in the comparator 48 is negligible.

In FIG. 4 a further embodiment of the control unit 32 is shown comprising a second flip flop 68, wherein a signal $V_p$ indicating that the switch voltage V30 has started to drop is fed into the logic connected to flip flop 56 as a prepare-for-set signal. When the signal $V_p$ has been received, the voltage slope detector 38 is used to determine when the next zero crossing of the slope of the switch voltage V30 occurs and is then used to determine the switch on of the controllable switch 22. The signal $V_p$ is fed into an additional NAND-gate 70 connected to the AND-gate 60, which is also connected to the second flip flop 68 in order to allow for the resetting of the "prepare-for-set" signal $V_p$.

The switch-off procedure of the controllable switch 22 is in this embodiment identical to the previous embodiment. The switch-on procedure is as follows. When the controllable switch 22 is turned off, the inductor current 130 eventually starts to decrease. When the inductor current 130 is reduced to zero and the reverse recovery time (if any) has elapsed, the resonant interval will start to decrease the switch voltage V30 towards zero. When the switch voltage V30 starts to decrease, the voltage slope detector 38 indicates a negative voltage slope, wherein the voltage slope needs to be sufficiently negative due to the additional current source 62 in order to trigger the change. This switches the signal $V_p$ to high. The voltage slope detector 38 further indicates that the voltage slope has come sufficiently close to zero by switching the signal $V_S$ from logic-low to logic-high at some later time. Since both the signal $V_p$ is logic-high and the signal $V_S$ has switched, the gate voltage $V_G$ is switched to logic-high after a delay and the controllable switch 22 is switched on.

Figure 5:
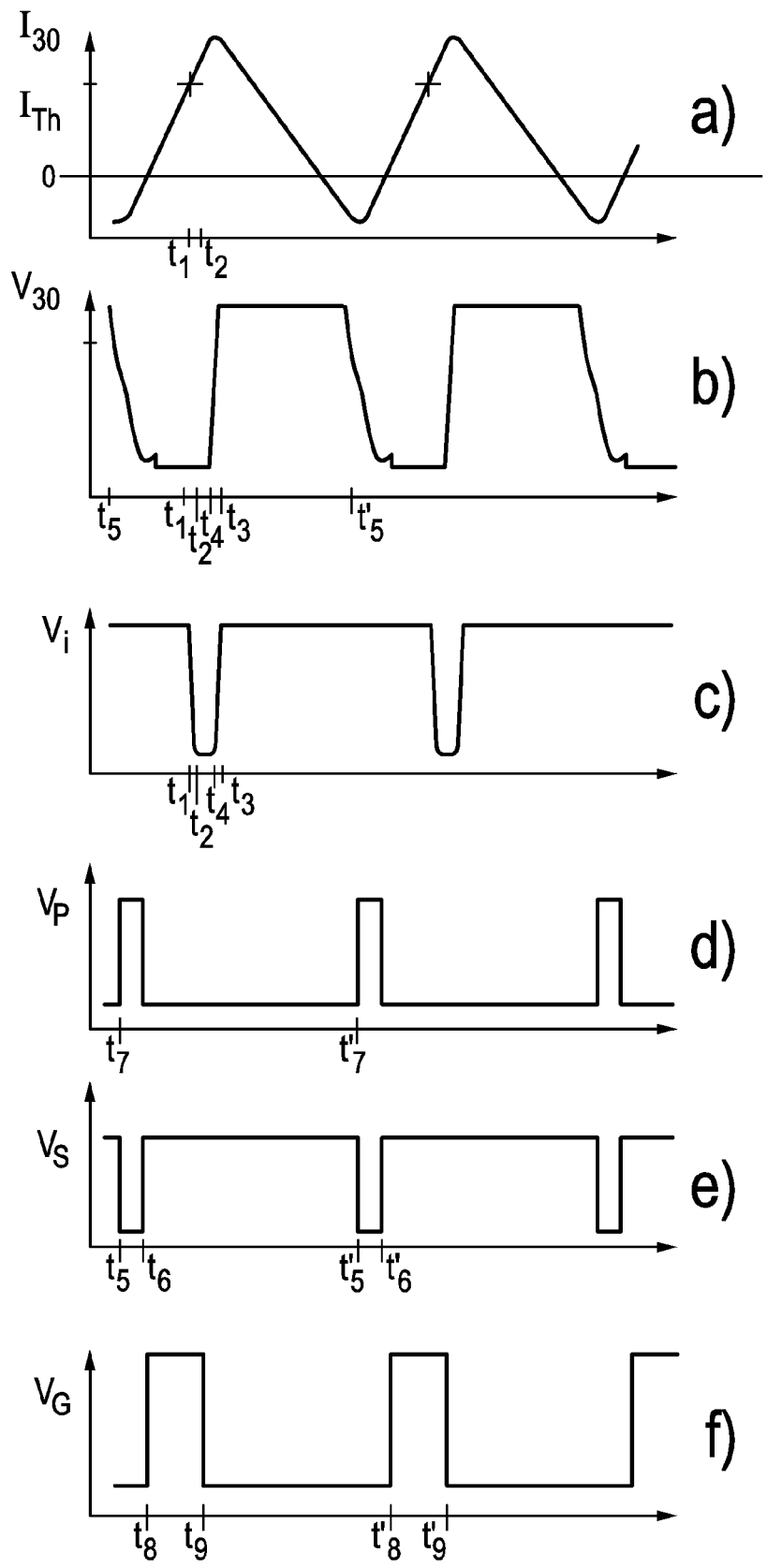

FIG. 5 shows a timing diagram of the switch voltage V30, the inductor current 130, the signal $V_i$, the signal $V_p$, the signal $V_S$ and the gate voltage $V_G$ according to the embodiment of FIG. 4. The inductor current is shown in FIG. 5a, and the switch voltage V30 is shown in FIG. 5b.

The signal $V_i$ in FIG. 5c indicating when the inductor current 130 is above the threshold current is identical with the signal shown in FIG. 3c.

The signal $V_S$ in FIG. 5e switches to logic-low at $t_5$ when the slope of the switch voltage V30 becomes sufficiently negative. This causes $V_p$ in FIG. 5d to go high at some point shortly thereafter, at $t_7$, indicating that the "prepare-for-set" condition has been achieved. When the slope of the switch voltage V30 comes sufficiently close to zero, $V_S$ is switched from logic-low to logic-high at $t_6$. Since $V_p$ is high and $V_S$ has switched, this triggers the gate signal $V_G$ in FIG. 5f to go logic-high after some delay, and the controllable switch is switched on at $t_8$. In addition, we use the low-to-high transition of $V_S$ as a trigger to reset the $V_p$ signal to logic-low since we are no longer in the "prepare-for-set" condition.

Due to the signal $V_p$ as a prepare-for-set signal and the signal $V_S$ determining the switching, the switch-on procedure is more robust to variations in the timing of the resonant interval during operation.

In a further embodiment, the current threshold may be adjusted within an AC cycle of the input voltage V10 to yield a higher power factor. The current and/or voltage sensing may be implemented via inductive coupling to the respective conductors of the converter unit 10. In a further embodiment the switching of the controllable switch 22 may be based on the detection of a voltage slope close to zero beyond or after the first detected zero slope, wherein the prepare-for-set for such a detection may be adjusted.

The converter unit 10 may be a boost converter, a buck converter, a buck-boost converter, a Class E converter, or a flyback converter.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A Converter unit for converting an input voltage to an output voltage, comprising:
   input terminals for connecting the converter unit to a voltage supply and for receiving the input voltage from the voltage supply,
   output terminals for connecting the converter unit to a load for driving the load,
   a controllable switch,
   an inductor connected to the controllable switch,
   a current detector for detecting an inductor current,
   a voltage slope detector for detecting a voltage slope measured across the controllable switch, and
   a control unit for controlling the controllable switch on the basis of the inductor current and the voltage slope, and
   wherein the voltage slope detector comprises two diodes connected antiparallel to each other and connected via a capacitor to the controllable switch, a voltage detector for detecting a voltage at the two diodes and an offset voltage source for providing an offset voltage potential to the two diodes.

2. The Converter unit as claimed in claim 1, wherein the control unit is adapted to switch the controllable switch off based on the inductor current detected by the current detector and to switch the controllable switch on based on the voltage slope detected by the voltage slope detector.

3. The Converter unit as claimed in claim 2, wherein the control unit is adapted to switch the controllable switch off when the inductor current reaches a threshold value and to switch the controllable switch on when the voltage slope reaches a predefined value.

4. The Converter unit as claimed in claim 1, wherein the current detector comprises a resistor connected in series to the controllable switch and a voltage detector for detecting a voltage at the resistor.

5. The Converter unit as claimed in claim 4, wherein the resistor is connected in series to the inductor.

6. The Converter unit as claimed in claim 1, wherein the voltage slope detector comprises a reference voltage source connected via a reference resistor to the two diodes.

7. The Converter unit as claimed in claim 1, wherein the current detector comprises a plurality of sensor switches connected in parallel to each other and connected in parallel to the controllable switch for dividing the inductor current in a plurality of sense currents.

8. The Converter unit as claimed in claim 7, wherein the current detector comprises a comparator circuit for comparing one of the sense currents to a reference current.

9. The Converter unit as claimed in claim 1, wherein a sensor switch is connected via a sense resistor in parallel to the controllable switch to detect a sense voltage at the sense resistor corresponding to the inductor current.

10. The Converter unit as claimed in claim 1, wherein the control unit is adapted to control the controllable switch off based on the inductor current and on based on two different consecutive voltage slope values.

11. The Converter unit as claimed in claim 1, wherein the control unit comprises at least one logical gate for controlling the controllable switch on the basis of the voltage slope and the inductor current.

\* \* \* \* \*